Oct. 21, 1958 J. WYLEN 2,857,586

LOGICAL MAGNETIC CIRCUITS

Filed April 8, 1954

| p | q | S | C |
|---|---|---|---|
| 0 | 0 | 0 | 0 |
| 0 | 1 | 1 | 0 |
| 1 | 0 | 1 | 0 |
| 1 | 1 | 0 | 1 |

INVENTOR
JOSEPH WYLEN
BY
Lawrence R. Brown
ATTORNEY

United States Patent Office 2,857,586

Patented Oct. 21, 1958

2,857,586

LOGICAL MAGNETIC CIRCUITS

Joseph Wylen, Philadelphia, Pa., assignor to Burroughs Corporation, Detroit, Mich., a corporation of Michigan Application April 8, 1954, Serial No. 421,790

8 Claims. (Cl. 340—174)

This invention relates to magnetic memory circuits and more particularly it relates to static magnetic storage elements for performing logical operations.

Magnetic storage elements have been used as switching devices in shift registers of the prior art as evidenced by such published articles as that by A. D. Booth entitled "An Electronic Digital Computer" appearing in Electronic Engineering for December 1950. The magnetic switching elements of these registers have magnetic cores exhibiting a substantially rectangular hysteresis characteristic. Accordingly, the elements tend to remain in one or the other permanent magnetic remanence condition after being driven into magnetic saturation by signals presented at a transformer winding about the element. The two states of magnetic remanence provided by these cores enable them to efficiently store binary information and retain it statically until removed. When an element is in one remanence condition, little voltage will be induced in the windings about the transformer by input signals of a polarity tending to establish the same remanence condition in the element. However, when the input signal is opposite in polarity to the storage state of the element, a high voltage is induced and an output signal is afforded by the element. Therefore, the elements are interrogated with a signal of known polarity to determine their remanence condition.

In prior art magnetic elements having a plurality of windings about the core material, a signal is induced in all of the windings when the element is interrogated. Therefore, prior art devices have required asymmetrically conducting circuits or timed gates for distinguishing between desired and undesired output conditions. In addition, the information could be read out of the cores into several circuits at the same time, but not selectively into separate specified circuits coupled to only some of the output windings of any one element. Means for effecting a conditional transfer into a specified circuit by establishing current flow in a predetermined transfer condition but not in response to a change of storage state alone is disclosed and claimed in the copending applications of John O. Paivinen, Serial Numbers 396,603 and 396,605 filed December 7, 1953, and Serial No. 420,135, filed March 31, 1954, the latter being a continuation-in-part of application Serial No. 396,604, filed December 7, 1953, now abandoned. Without the use of such conditional transfer techniques, it has neither been feasible to selectively use information in the core nor to prevent switching noises from disturbing the output circuits to which the elements are coupled.

It has been customary in the prior art to use magnetic elements as delay means or switching devices in shift registers and as storage units in matrix memory systems. However, in order to universally use such storage elements in electronic computer circuits it is also necessary to perform logical operations. The elements inherently operate in such a manner that a logical "or" function may be performed with two input transformer windings. However, it has been difficult in the prior art to perform the logical "and" operation because it was necessary to provide coincident input pulses of a predetermined amplitude. With such circuits the operation has been marginal and associated circuitry has been complex.

Prior art magnetic storage elements in addition provided output signal current flow in all of the transformer windings about the elements whenever the storage state of the element has been changed from one condition to another. This has resulted in an unconditional transfer of information into all of the output circuits coupled to the storage element and the transfer of noise pulses into the output circuits when logical operations were performed within the elements. With such unconditional transfer operation, it has therefore been difficult to manipulate information within the elements in order to perform desired logical operations with a minimum amount of circuitry.

By utilizing conditional transfer techniques in static magnetic elements, wherein the information is transferred to certain output circuits only in response to predetermined transfer conditions, the present invention affords improved logical operation. For example, the invention provides a logical "and" operation with a pair of static magnetic elements having conditional transfer output circuits connected thereto. These logical "and" circuits are commonly known as magnetic gating circuits, and they serve to provide an output signal in response to input information signals ($p$ or $q$) if and only if both $p$ and $q$ are present together ($p.q$). Each of the elements is preset in an opposite storage state, and the input information $p$ or $q$ is used to selectively change the preset storage state of a respective element. The information is read into the elements at a time sequence after the presetting operation, but may be independently effected at any time relationship in either element before a later sequential logical operation within the elements. Therefore, each element may be set by input information signals which are neither time nor amplitude sensitive. A subsequent conditional transfer of the information from one of the elements to the other is effected to perform the required logic, and the result is conditionally read out of the latter element.

It is, accordingly, an important object of the invention to provide improved logical circuits utilizing binary storage elements.

Another important object of the invention is to provide logical operations with static magnetic storage elements utilizing conditional transfer techniques.

A further important object of the invention is to provide improved magnetic gating circuits.

Further objects and features of the invention will be found throughout the following more detailed discussion of the invention, particularly when considered in connection with the accompanying drawing, in which.

Figure 1:
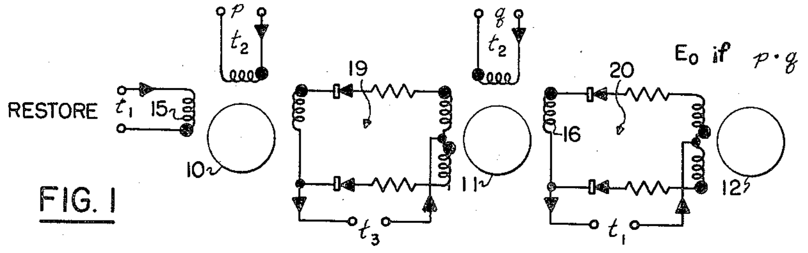
Fig. 1 is a schematic circuit diagram of a magnetic gating circuit of the invention.

Throughout the drawings, like reference characters are used to identify similar features in order to facilitate comparison of the several views. Logical circuit diagrams are used in order to more simply point out those features contributed by the present invention, where the circuit details themselves do not constitute a part of the invention.

In Fig. 1 the static magnetic storage elements are indicated by circles 10, 11, and 12 about which the respective transformer windings are provided. The current flow notation is used in connection with transformer windings to indicate that when current enters the dotted terminal it tends to switch the core into the "0" state, and when it enters the non-dotted terminal it tends to switch the core into the "1" state. The direction of the current flow is indicated by arrows along the respective leads. This circuit embodiment performs the logical "and" operation. In order to precondition the elements 10 and 11, for performing the logical "and" operation, they are respectively set in the differing storage states "1" and "0" by windings 15 and 16. This operation is performed at time $t_1$ representing a period for completion of the first of a sequence of timed actions, and the preconditioning of each element need not be in coincidence but may take place at different instants during the relative timing period $t_1$. The two bits of intelligible information "$p$" and "$q$" which are to be used, may be selectively provided at a later time to change the reset storage states 10 and 11 to "0" and "1" respectively. This action takes place during the time period $t_2$. Neither $p$ nor $q$ need be of critical amplitude as long as they are above the switching amplitude of the cores, and the signals may arrive either together or separately before the subsequent logical operation takes place during the subsequent time period $t_3$. The logical operation at time period $t_3$ consists of a transfer of stored information between elements 10 and 11 by way of the conditional transfer loop 19. The impedance of the source of transfer current applied to loop 19 at time period $t_3$ is substantially infinite at time periods $t_1$ and $t_2$ when no transfer pulse is being applied. Accordingly transfer is effected between elements 10 and 11 only when the current is flowing in the transfer loop 19 during time period $t_3$, and therefore all other operations in either element are isolated from each other. This transfer action causes the $E_o$ output signal result to be placed in element 11, that is, the magnetic state of core 11 as established by the transfer current in loop 19 during time period $t_3$ determines whether or not an output signal $E_o$ will be produced during the succeeding time period $t_1$ which follows the time period $t_3$. For, when a transfer pulse is applied to the terminals of transfer loop 20 at the succeeding time $t_1$, if core 11 is then in the "1" state, the transfer current switches the core 11 to the "0" state, and a back voltage is induced in winding 16 which is positive at the dot end and hence of a polarity to cut off the diode in the upper branch of loop 20. This forces the remainder of the transfer current to flow through the lower branch of loop 20, and the current in the lower half of the input winding of core 12 is thereby increased sufficiently to switch the core 12 to the "1" state. If, on the other hand, when the transfer pulse is applied to loop 20, the core 11 is in the "0" state, the core 11 is not switched and no back voltage is induced in winding 16 to cut off the diode in the upper branch. Thus, the transfer current in loop 20 flows in substantially equal amounts through the upper and lower halves of the transfer-input winding of core 12, and core 12 remains in its previous state. Since the impedance of the source of transfer-current pulse applied to loop 20 at the time $t_1$ is infinitely high when no transfer pulse is being applied, the output element 12 likewise is shielded by the conditional transfer loop 20 from noise generated in the logical elements 10 and 11. In this manner the circuit operation is made extremely reliable. The noise isolation is effected by means of the diodes in the transfer loop, which prevent current flow around the transfer loop in response to the voltage induced in the single ended output winding on the transmitting element.

A transfer may not only be effected in this type of conditional transfer loop (19) by passing current through the loop during the time period $t_3$. When a switching operation does not take place, current flow will tend to divide evenly through the split windings and the two diodes, with the single ended winding being in one branch current path. The resistors are provided to balance current flow in the two branch current paths in case of slight misbalance of components. As long as the current flow remains balanced no information is stored by the split winding because the net flux generated by the winding is substantially zero. Should the current flow through the single ended winding, however, tend to switch the preceding element, a large impedance will be presented which will unbalance the current flow in the split winding in such proportions that the net flux is enough to switch the stored information into the element about which the split winding is located. Therefore, the transfer is made conditional upon the passage of current through the conditional transfer loop rather than upon the mere changing of the storage state within the preceding element.

Figures 2, 3:
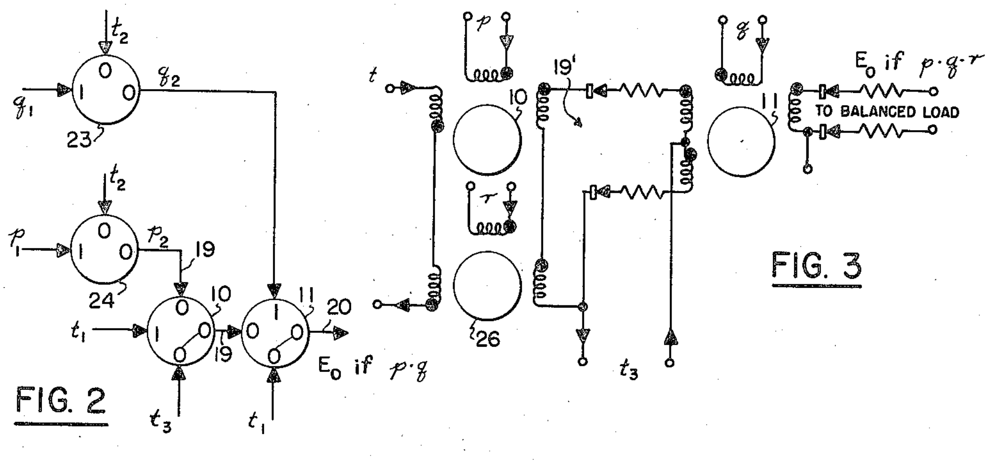
Fig. 2 is a logical circuit diagram of an improved gating circuit.
Fig. 3 is a schematic circuit for performing logical operations in accordance with the invention.

A logical designation of the binary storage circuits used in connection with the invention is shown in Fig. 2 in order to more simply illustrate the operation of the circuit in performing the logical "and" operation. Input windings are indicated by arrows at the respective elements, and the current flow is passed through the windings in such a direction that the designated storage condition is effected. Output windings from the elements are represented by leads leaving the elements. The legend at these leads indicates the direction to which an element must be switched in order to provide an output signal. A conditional transfer loop is indicated by an eyebrow or light line connection between magnetic-stage legends to designate a related input-output function.

The input signals $p$ and $q$ of Fig. 2 are derived during time period $t_2$ from input elements 23 and 24. The signals are selectively presented to the input elements from some external source during time period $t_1$ as denoted by the subscripts of $p$ and $q$. These input elements 23 and 24 are provided with conventional unconditional transfer loops which during time $t_2$ provide signals $p_2$ and $q_2$ at the input windings of elements 10 and 11. These elements correspond to the logical elements of Fig. 1 and the eyebrow notations, i. e., the light lines connecting the "0" notations in the lower righthand portions of cores 10 and 11 of Fig. 2, indicate that each output loop provides a conditional transfer operation. Since the elements 10 and 11 are preset in opposite states "1" and "0" respectively during period $t_1$, input signals at both elements 10 and 11 are required to overcome the preset condition and place the elements in the respective storage states "0" and "1." Only in this condition is an output signal $E_o$ provided at the conditional transfer loop 20 by a transfer command during period $t_1$, since this is the only condition in which element 11 will retain a stored "1."

Should only the input signal $p_2$ arrive, element 10 will have a "0" stored therein and accordingly no output signal will be transferred by the conditional transfer loop 19 to element 11, which therefore remains in its "0" storage state. Likewise if only the signal $q_2$ arrives, the transfer loop 19 will transfer the "1" from element 10 to element 11 changing element 11 to "0," so that the stored "1" necessary for providing an output signal $E_o$ at $t_1$ is absent. Even though element 11 is switched at this time, no output signal is provided in the transfer loop 20 because of the conditional transfer characteristic. This feature is extremely important since otherwise it would be necessary to provide complex inhibiting functions or timed gating circuits in order to effect the logical operational steps provided in accordance with this invention.

Fig. 3 illustrates a similar logical "and" circuit as constructed for operation with more than two input signals. In this embodiment further magnetic elements such as 26 are provided for receiving the further information signals. This circuit operates in the same general manner hereinbefore described, except that it is necessary to remove the preset condition "1" from both elements 10 and 26 of a logical "or" combination in order to provide an output signal. This "or" circuit may be extended to include more than two elements if desired.

Figure 4:
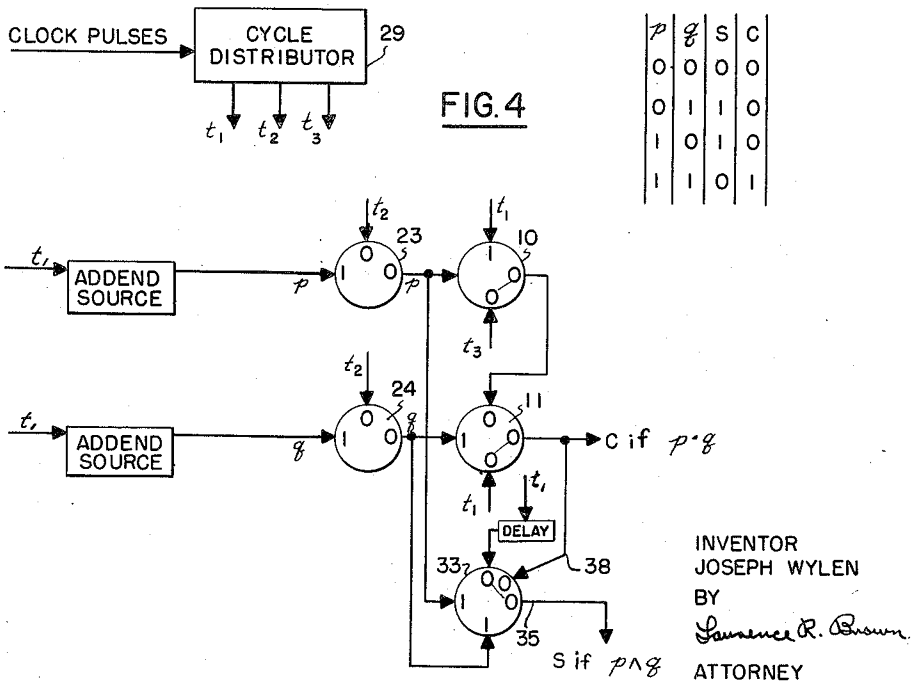
Fig. 4 is a logical circuit diagram of a half-adder circuit embodiment of the invention.

The logical "and" operation may be used in connection with an addition process in the manner illustrated in the embodiment of Fig. 4. The accompanying truth table indicates the sum (S) and carry (C) signal relationship necessary for providing the binary sum of the two input signals $p$ and $q$. It is seen, therefore, that a carry C is generated if and only if both $p$ and $q$ are present, whereas the sum S is provided if and only if $p$ or $q$ is present but not if $p$ and $q$ is present ($p \wedge q$). The cycle distributor 29 generates the sequence of timed current pulses during periods $t_1$, $t_2$ and $t_3$, which are used in operation of the adder circuit. Those pulses arriving anytime during period $f_1$ occurring between successive $f_3$ and $t_2$ periods may be used to time the input addend and augend signals $p$ and $q$ in the event they are derived from an asynchronous source. Thus, the signals $p$ and $q$ are stored in the respective input buffer elements 23 and 24, from which they are derived during period $t_2$ to provide the input signals to the logical "and" elements 10 and 11. Elements 10 and 11 operate in the manner hereinbefore described to provide the carry signal C ($p.q$). A further logical "or" circuit 33 is provided for deriving the desired sum S ($p \wedge q$). In this circuit both the $p$ and $q$ signals tend to set the element 33 in its "1" storage condition. Should either or both input signals arrive during time period $t_2$, the conditional transfer circuit 35 will generate an output signal in response to the interrogation signal during time period $t_1$, which in addition resets the element to "0." In this logical "or" operation, the conditional transfer circuit operates in the manner hereinbefore described to prevent the necessity of inhibiting output noise due to switching within the element at any time other than that in which current is passed through the condtional transfer loop 35. Since the basic "or" circuit of element 33 provides an output signal when both $p$ and $q$ are present, a further logical "not" circuit 38 is provided for restoring element 33 to its "0" state with the output carry signal. Enough delay is then inserted in the $t_1$ readout pulse to the conditional transfer circuit 35 that the core 33 may be switched to "0" by the carry signal before read-out. Thus, the proper sum output signal $p \wedge q$ is generated with a minimum of circuitry.

It is apparent from the above described embodiments of the invention that more reliable operation is provided than with the logical circuits of the prior art. Logical operations may be effected by the invention without strict requirements of constant signal amplitude or duration, coincident timing, or timed gating circuits to remove noise generated by manipulations within storage elements. Therefore, logical operations requiring manipulation of information within the storage elements without transferring disturbing noise may be performed by circuits constructed in accordance with the teachings of this invention. It is to be recognized that those circuit embodiments herein described will immediately suggest to persons skilled in the art certain variations and modificatons which do not depart from the spirit or scope of the invention. The features believed descriptive of the nature of the invention are defined with particularity in the appended claims.

I claim:

1. A logical "and" circuit comprising: first and second magnetic cores each capable of assuming either a first or second state of magnetic remanence, said first and second states being of opposite polarities; a restore winding on said first core responsive to a restore signal during a first time period for setting said first core in said first state of magnetic remanence; a restore winding on said second core responsive to a restore signal during said first time period for setting said second core in said second state of magnetic remanence; a data input winding on said first core effective, in response to a "$p$" data signal during a second time period, to switch said first core to said second state of magnetic remanence, said first core remaining in said first state of remanence, during said second time period, in the absence of a "$p$" data signal; a data input winding on said second core effective, in response to a "$q$" data signal during said second time period, to switch said second core to said first state of magnetic remanence, said second core remaining in said second state of remanence during said second time period in the absence of a "$q$" data signal; a transfer network interconnecting said first and second cores, said transfer network comprising an output winding on said first core, a transfer-input winding on said second core, and uni-directional conducting means in series with said first-core output winding and said second-core transfer-input winding, said uni-directional conducting means being poled to inhibit transfer of energy from said first-core output winding to said second-core transfer-input winding when said first core switches in response to a "$p$" data signal during said second time period; means effective during a third time period for driving transfer current through said uni-directional conducting means of said transfer network and through said first-core output winding in a direction to switch said first core to or maintain said first core in said second state, the switching of said first core or its failure to switch during said third time period in response to said transfer current being determined by the remanent state of said first core at the end of said second time period as determined by the presence or absence of a "$p$" data signal during said second time period, said transfer network being arranged, in response to the switching of said first core during said third time period, to divert transfer current from said first-core output winding to said second-core transfer-input winding to switch said second core to or maintain said second core in said second state, the switching of said second core or its failure to switch during said third time period in response to said transfer current being determined by the remanent state of said second core at the end of said second time period as determined by the presence or absence of a "$q$" data signal during said second time period; means for applying, during a fourth time period, a restore signal to said second core in response to which said second core switches to or is maintained in its said second state of remanence, the switching of said second core or its failure to switch during said fourth time period being determined by the remanent state of said second core at the end of said third time period as determined by the presence or absence of one or both said "$p$" and "$q$" data signals during said second time period; and means responsive to the switching of said second core in response to the application of said restore signal during said fourth time period for producing an output signal indicative of the fact that both a "$p$" data signal and a "$q$" data signal were applied during the said second time period, said first, second, third and fourth time periods occurring sequentially in that order.

2. Apparatus according to claim 1 characterized in that said means for applying a restore signal to said second core during said fourth time period and said means for producing an output signal combine to inhibit production of an output signal from said second core when said second core is switched to said first state during said second time period in response to the application of a "$q$" data signal and to inhibit production of an output signal when said second core is switched to said second state in response to said third period transfer current.

3. Apparatus according to claim 2 characterized in that said second-core transfer-input winding is tapped at an intermediate point; further characterized in that said uni-directional conducting means comprises a pair of diodes one of which is in series with one portion of said tapped transfer-input winding and said first-core output winding and the other of which is in series with the other portion of said tapped transfer-input winding, each of said diodes being poled to offer low impedance to current flow in the same direction in its connection and to offer high impedance to loop current; and further characterized in that said means effective during said third time period for driving transfer current through said uni-directional conducting means of said transfer network comprises means for driving current through said second-core transfer-input winding in opposing manner from said intermediate tap point to the ends of said transfer-input winding.

4. Apparatus according to claim 3 characterized in that said diodes are so poled relative to the first-core output winding that when said first core is switched during said third time period in response to said transfer current flowing therethrough a voltage is induced in said first-core output winding which back biases that diode through which said first-core output-winding transfer current flows, thereby effecting a diversion of transfer current from one portion of said tapped second-core transfer-input winding to the other portion thereof.

5. A logical "and" circuit comprising: first and second magnetic cores each capable of assuming either of two magnetic remanent states; means for setting said first core in a first magnetic state during a first time period; means for setting said second core in a second magnetic state during said first time period; means for applying a "*p*" data signal to said first core during a second time period to switch said first core to said second state, said first core remaining in said first state during said second time period in the absence of a "*p*" signal; means for applying a "*q*" data signal to said second core during said second time period to switch said second core to said first state, said second core remaining in said second state during said second time period in the absence of a "*q*" signal; an output winding on said first core; a transfer-input winding on said second core; a transfer network including uni-directional conducting means interconnecting said first-core output winding and said second-core transfer-input winding, said uni-directional conducting means being poled to inhibit transfer of energy from said first-core output winding to said second-core transfer-input winding when said first core is switched to said second state during said second time period in response to a "*p*" data signal; an output circuit for said second core adapted to inhibit flow of output current when said second core is switched during said second time period to said first state in response to a "*q*" signal; means for driving transfer current during a third time period through said transfer network and through said uni-directional conducting means to switch said first core to or maintain said first core in said second state, said transfer network being arranged, when said first core is switched during said third time period in response to said transfer current, to pass transfer current through said transfer-input winding of said second core in sufficient amount to switch said second core to or maintain said second core in said second state, said output circuit for said second core being arranged, when said second core switches during said third time period in response to said transfer current, to inhibit production of an output signal; and means for applying a reset signal to said second core during a fourth time period to reset said second core in said second state, said output circuit for said second core being arranged when said second core is switched during said fourth time period in response to the said reset signal to produce an output signal, said first, second, third and fourth time periods occurring sequentially in that order.

6. Apparatus according to claim 5 characterized in that said second-core transfer-input winding is provided with a tap at an intermediate point, and further characterized in that said means for driving transfer current during said third time period through said transfer network comprises a current source one terminal of which is connected to said intermediate tap point and the other terminal of which is connected to one end of said first-core output winding.

7. Apparatus according to claim 6 characterized in that said transfer network comprises a pair of diodes one of which is connected in the transfer-current path in series with said first-core output winding and one portion of said second-core transfer-input winding, and the other of which is connected in the transfer-current path in series with the other portion of said second-core transfer input winding.

8. A logical circuit comprising: first and second magnetic cores each capable of assuming either of two states of magnetic remanence; means effective during a first time period for setting said cores in different magnetic states; means interconnecting said cores, said means being effective to inhibit the transfer of energy between said cores when said cores are set during said first period; means effective during a second time period for applying a data signal to either or both of the cores to switch the core to which such data signal is applied to its other state, said interconnecting means being effective to inhibit transfer of energy between said cores when either or both cores change state in response to a data signal; means effective during a third time period for applying a transfer current to said interconnecting means to change said first core to, or to maintain said first core in, the state other than its original set state, said interconnecting means being effective in the event said first core changes its state in response to said third period transfer current to transfer energy to said second core to change said second core to, or to maintain said second core in, its original set state; a utilization device; output means for said second core connected to said utilization device, said output means being effective to inhibit transfer of an output signal to said utilization device in the event said second core changes its state in response to the transfer of energy from said first core during said third period; and means effective during a fourth time period for applying a transfer current to said second core to change said second core to, or to maintain said second core in, its original set state, said second-core output means being effective to transfer an output signal to said utilization device in the event said second core changes its state in response to said fourth period transfer current.

References Cited in the file of this patent

UNITED STATES PATENTS

| | | |
|---|---|---|
| 2,695,993 | Haynes | Nov. 30, 1954 |
| 2,729,807 | Paivinen | Jan. 3, 1956 |

OTHER REFERENCES

Article: "Magnetic Binaries in the Logical Design of Information Handling Machines," in Proc. of Assoc. for Computing Machinery. May 1952, pp. 223–229.

UNITED STATES PATENT OFFICE

Certificate of Correction

Patent No. 2,857,586

October 21, 1958

Joseph Wylen

It is hereby certified that error appears in the printed specification of the above numbered patent requiring correction and that the said Letters Patent should read as corrected below.

Column 3, line 66, strike out "not"; column 5, line 10, for "$f_1$" read —$t_1$—; same line, for "$f_3$" read —$t_3$—; line 31, for "condtional" read —conditional—.

Signed and sealed this 26th day of May 1959.

[SEAL]

Attest:

KARL H. AXLINE,
*Attesting Officer.*

ROBERT C. WATSON,
*Commissioner of Patents.*